United States Patent [19]

Abate-Daga et al.

[11] 3,917,768
[45] Nov. 4, 1975

[54] SINTERED NUCLEAR FUEL AND METHOD OF PREPARING SAME

[75] Inventors: Giancarlo Abate-Daga; Ignazio Amato, both of Turin, Italy

[73] Assignee: Fiat Societa per Azioni, Turin, Italy

[22] Filed: Feb. 15, 1973

[21] Appl. No.: 332,835

Related U.S. Application Data

[62] Division of Ser. No. 885,524, Dec. 16, 1969, Pat. No. 3,759,786.

[30] Foreign Application Priority Data

Feb. 25, 1969 Italy .................................. 50722/69

[52] U.S. Cl. ................ 264/.5; 176/68; 176/93 BP; 252/301.1
[51] Int. Cl.² .......................................... G21C 21/00
[58] Field of Search ............... 252/301.1 R, 301.1 S; 264/.5; 176/69, 68, 93, 93 BP, 67; 423/260, 261

[56] References Cited

UNITED STATES PATENTS

| | | | |
|---|---|---|---|
| 3,117,372 | 1/1964 | McNees | 176/93 R |
| 3,243,349 | 3/1966 | Goeddell | 176/93 R X |
| 3,263,004 | 7/1966 | Bean | 176/93 R X |
| 3,320,176 | 5/1967 | Davis | 264/.5 |
| 3,325,363 | 6/1967 | Goeddell | 176/93 R X |
| 3,349,152 | 10/1967 | Watanabe | 176/93 R X |
| 3,356,618 | 12/1967 | Rich et al. | 176/93 R X |
| 3,422,167 | 1/1969 | Bowman et al. | 264/.5 X |
| 3,501,411 | 3/1970 | Triggiani | 176/93 R X |
| 3,510,545 | 5/1970 | Nishiyama et al. | 176/93 BP X |
| 3,619,241 | 11/1971 | Goeddell | 176/91 X |

OTHER PUBLICATIONS

"Reactor Core Materials," Volume 4, Number 2, May 1961, pp. 58-59.

*Primary Examiner*—Samuel Feinberg
*Assistant Examiner*—Harold Tudor
*Attorney, Agent, or Firm*—Sughrue, Rothwell, Mion, Zinn & Macpeak

[57] ABSTRACT

A method of preparing a nuclear fuel containing a consumable nuclear poison, uniformly distributed therein in the form of coated micro-spheres of between 10 and 2,000 microns diameter, consisting in preparing sintered micro-spheres of the consumable poison, covering those micro-spheres with a protective coating and incorporating the coated micro-spheres into uranium dioxide powder, followed by sintering.

5 Claims, 7 Drawing Figures

SINTERED NUCLEAR FUEL AND METHOD OF PREPARING SAME

This is a division of application Ser. No. 885,524, filed Dec. 16, 1969, now U.S. Pat. No. 3,759,786.

The present invention relates to a sintered nuclear fuel, in particular sintered uranium dioxide, containing a consumable nuclear poison, and to a process for the production thereof.

What is meant by consumable (combustible) poisons is substances having a high neutron-capture section, situated in the core, though not located only in the control rods, but distributed within the fuel mass, so as to be consumed at about the same speed as the fuel.

The advantages of using consumable poisons are as follows:

1. The charge of missile fuel may be made larger, so that the life of the core is prolonged.
2. The consumable poison can be introduced in large enough quantities to reduce the initial reactivity to about that which exists at the end of the core life, so that fewer control rods are needed.
3. The poison can be localised in such positions within the core as to level out the power distribution therein.

The most advantageous form of distribution, which has long been sought, is that in which the consumable poison is mixed uniformly with the fuel (uniform poison distribution).

Materials particularly concerned as lending themselves to being used as consumable poisons are the oxides of rare earths and the borides of metals.

The purpose of the present invention is the production of a nuclear fuel, and in particular a sintered form of uranium dioxide, containing a consumable poison distributed uniformly throughout.

This is achieved, according to the invention, by introducing the consumable poison uniformly, in the form of sintered micro-spheres, into the nuclear fuel powder, and sintering the resultant mass. During this process, however, drawbacks may present themselves, such as the partial or complete reaction of the poison with the fuel, and hence, to overcome these difficulties, the sintered micro-spheres are coated with some suitable substance such as, for example, molybdenum.

More specifically, therefore, the inventive process incorporates the following stages:

1. Preparation of sintered micro-spheres of a consumable poison e.g. rare earth oxides such as $Gd_2O_3$, or metal borides, 10 to 2000 microns diameter.
2. Application of a protective coating.
3. Incorporation of the coated micro-spheres into the nuclear fuel powder, following by sintering.

In view of the advantages offered by uranium dioxide as nuclear fuel and by the rare earths as consumable nuclear poison, the inventive process will be described hereunder in greater detail with special reference to those substances.

STAGE 1:

The preparation of micro-spheres of rare earth oxides is carried out by a sol-gel method, which consists in spheroidising an aqueous colloidal solution of a rare earth hydroxide by introduction into a solvent of low water solubility, the micro-spheres thus produced being then subjected to heat treatment until a density very close to the theoretical value is obtained.

The preparation of the colloidal solution of a rare earth hydroxide involves the following steps:

1. The addition of a base to an aqueous solution of a rare earth salt or, vice versa, the addition of a solution of a rare earth salt to a base, to precipitate the rare earth hydroxide.
2. Separation of the precipitate by centrifuging, for example, and thorough washing.
3. Dispersion of the precipitate in de-ionised water and addition of a peptising agent.
4. Heating of the suspension to a temperature of between 25°C. and 120°C. for a period of a few minutes to some hours, until peptisation has been achieved.

All these operations are carried out in air, though it may be preferable to work in an inert atmosphere.

The base used for precipitation should preferably be ammonium hydroxide, but other bases may be used, such as, for instance, tetralkyl ammonium hydroxides.

The washing of the precipitated rare earth hydroxide is carried out with de-ionised water, but it is preferable for the washing to be initiated with a solution of ammonium hydroxide and then continued with de-ionised water.

The peptising agent is preferably a nitrate of the rare earth or else nitric acid.

To obtain acceptable spheroidisation conditions, the concentration of the colloidal solution is desirably 0.1 M to 3 M and the amount of peptising agent must be such that the molar ratio between nitrate and metal ions lies between 0.05 and 1; in general, the lower the concentration, the higher is the ratio required. It is more convenient, however, to employ more concentrated solutions and lower ratios between nitrate and metal ions, both in order to quicken dehydration during the spheroidising stage and to lower the densification temperature of the spheres.

The micro-spheres of gel are formed by the injection of sol droplets into a column filled with a long-chain alcohol, such as amyl alcohol or 2-ethyl-1-hexanol, for example, or with a mixture of alcohols from $C_7$ to $C_9$, predominantly long-chain. Small quantities are also added of a surfactant such as, for instance, an ester of sorbitol with fatty acids, to prevent the micro-spheres from agglomerating.

Within the column are maintained an ascending flow, a cross flow and a flow coaxial with the sol injection capillary. This movement in the fluids is desirable so as to keep the micro-spheres continuously in suspension and rotation and achieve isotropic gelling. The time required for dehydration varies from 15 minutes to 40 minutes, depending on the sol concentration and the diameter of the micro-spheres. The micro-spheres obtained in this way have a final diameter which can be varied at will from a few microns to 2,000 microns and more, by variation of the injection velocity and, within limits, the sol concentration.

To obtain micro-spheres having a diameter of between 2 microns and 200 microns, however, it is preferable to maintain, within the vessel containing the gelling mixture, sufficient agitation to keep the micro-spheres in suspension. Injection of the droplets of sol can be effected by means of a vibrating capillary. Variation of the frequency of vibration and of the speed of agitation of the gelling mixture makes it possible to obtain micro-spheres of the desired diameter.

After removal from the column, the micro-spheres are washed with a readily volatile organic solvent, such as ethyl ether or acetone, for example, so as to remove whatever gelling mixture still remains, after which they are dried in vacuo and then sintered in air. The heat cycle adopted for sintering should be such as to bring about the complete elimination of volatile matter while all the interstices are still in communication with one another and with the atmosphere outside. It is desirable to work in vacuo up to a temperature of about 1,000°C., so as to avoid the absorption of carbon dioxide and the consequent formation of carbonates, which, in breaking down at approximately 950°C., might produce cracks or bulges in the micro-spheres. A density equal to 98% of the theoretical density is attained as soon as temperatures in the vicinity of 1,200°C. are reached.

The densified micro-spheres are subsequently raised to a temperature of about 1,700°C., that is to say the maximum temperature to which they will be subjected during the sintering cycle of the uranium dioxide. During such phase transitions as may occur in this way, perfect sphericity is maintained; there is obviously a variation in volume, but the value of 98% of the new theoretical density remains unchanged.

STAGE 2:

Prior to incorporation in the uranium dioxide powder, the micro-spheres are given a coating of molybdenum a few microns in thickness, operating in a fluidised bed with molybdenum hexacarbonyl as the molybdenum source.

STAGE 3:

When thus coated, the micro-spheres are mixed with commercial ceramic-grade uranium dioxide powder, the resultant mixture being pressed into pellets and sintered in hydrogen for 2 hours at 1,700°C.

EXAMPLE I

A 0.2 M. aqueous solution of gadolinium nitrate was added to a 2 M. aqueous ammonia solution resulting in the precipitation of gadolinium hydroxide. The precipitate was separated by centrifuging and washed first with concentrated ammonia then with de-ionised water, free from $CO_2$, 5 or 6 times. Then the precipitate was dispersed in dilute nitric acid and then heated to about 80°C., until peptised (approximately 1 hour). The final sol concentration was about 2 M.

The colloidal solution was examined by various analytical techniques.

Examination by electron microscope showed that the sol consisted of units in the form of rods having a length to width ratio of about 10:1. An electron micrograph (42,000 x) of the colloidal solution of $Gd(OH)_3$ just mentioned appears in FIG. 1.

The conductivity of the sol was determined at 25°C. and 1 Kc with a conventional meter, applying the formula $$L_{sol} = K/R$$

in which K is the cell constant in $cm^{-1}$ and R is the resistance in ohms. The conductivity was found to be $1.53 \times 10^{-2}$ mho $cm^{-1}$.

The pH value, measured potentiometrically with conventional apparatus, lay between 6.2 and 6.8.

Next, the colloidal solution of $Gd(OH)_3$ was spheroidised and gelled by being introduced into Alphanol - a long-chain ($C_7$–$C_9$) alcohol produced by Shell - containing 0.5% of the commercial surfactant Span 80 (made by Atlas Chem. Ind.), in accordance with the general procedure described above.

After removal from the column, the micro-spheres obtained were washed with ethyl ether and then heat-treated to convert them into micro-spheres of oxide, as follows:

To begin with, the spheres were dried at 200°C. for from 2 to 4 hours, then they were heated to 500° – 600°C. and maintained at that temperature for 4 to 6 hours and finally they were heated for 2 hours at 950°C. All of these operations were carried out in vacuo. Then the micro-spheres were heated in air to 1,200°C. and kept at that temperature for 2 hours, so as to obtain a density of 96 – 99% of the theoretical. FIG. 2 is a photograph (20 x) of micro-spheres of gadolinium sesquioxide sintered at 1,200°C. and FIG. 3 is a photograph (100 x) of the corresponding polished sections.

The densified micro-spheres were then raised to a temperature of about 1,700°C., that is to say the maximum temperature to which they are subjected during the sintering of the uranium dioxide. During the phase transitions that occurred in consequence ($Gd_2O_3$ changing from cubic to monoclinic at about 1,300°C.), it was noted that perfect sphericity was retained.

The covering of the micro-spheres with a protective coating of molybdenum was carried out by vapour deposition, using the conventional fluidised-bed technique, the molybdenum source employed being molybdenum hexacarbonyl, with argon as the gaseous vehicle, at a temperature in the region of 200°C. FIG. 4 is a photograph of a coated micro-sphere after section.

Amounts of 600 p.p.m. and 1,200 p.p.m. of molybdenumcoated micro-spheres of $Gd_2O_3$ were mixed with ceramic-grade commercial $UO_2$ powder; the mixtures were pressed into pellets up to a pressed density of 50%-55% of the theoretical density and the pellets were sintered in hydrogen. By way of control, pellets of uranium dioxide free from $Gd_2O_3$ were prepared and sintered in the same way.

As can clearly be seen from these curves, in both cases no appreciable differences in behaviour are to be observed between the pure uranium dioxide and that containing $Gd_2O_3$. It will be noted in particular, for example, that with sintering for 3 hours at 1,400°C., the sintered pellets have a density equal to 95% of the theoretical, irrespective of $Gd_2O_3$ content.

Figure 1:
Figure 2:
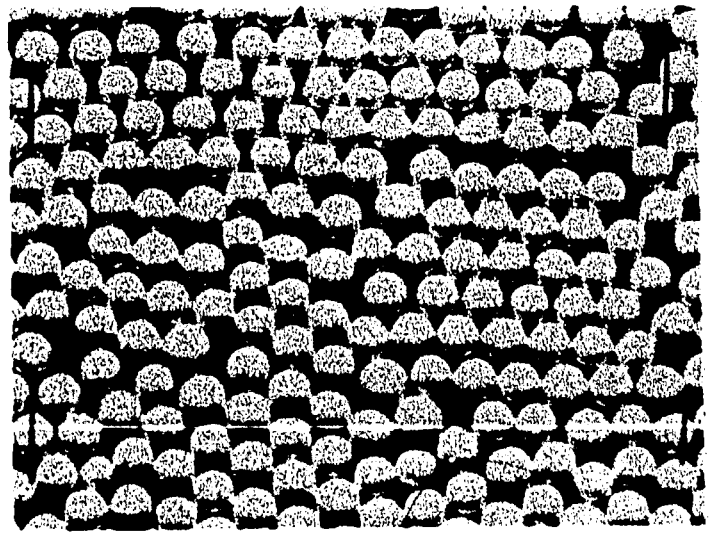
Figure 3:
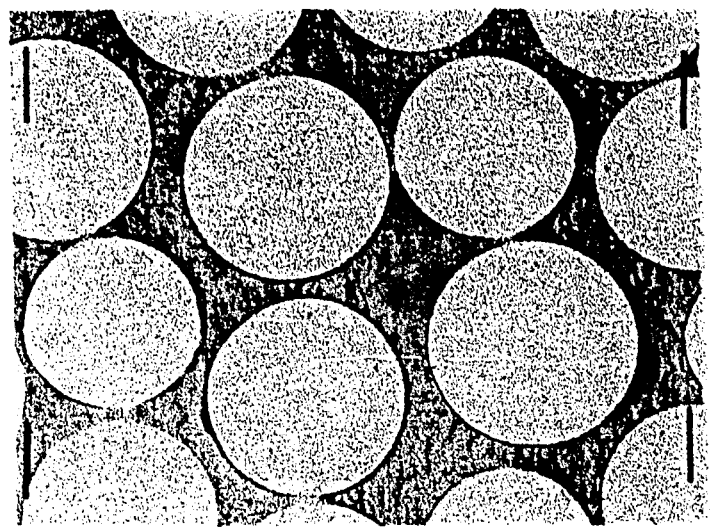
Figure 4:
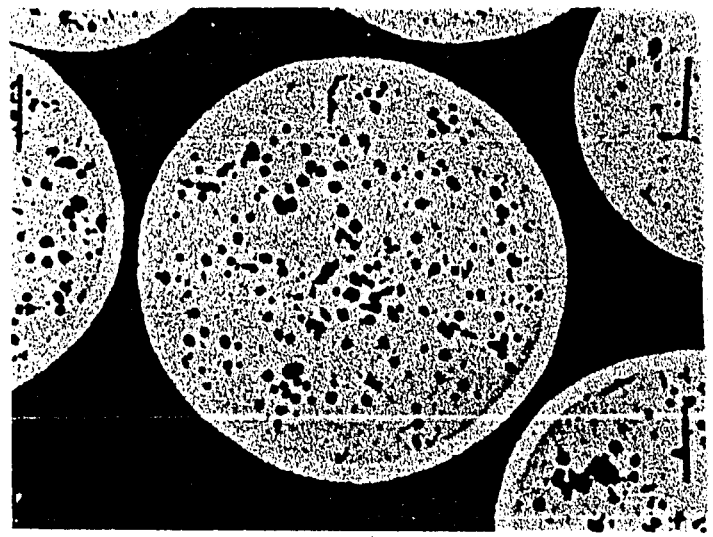
Figure 5:
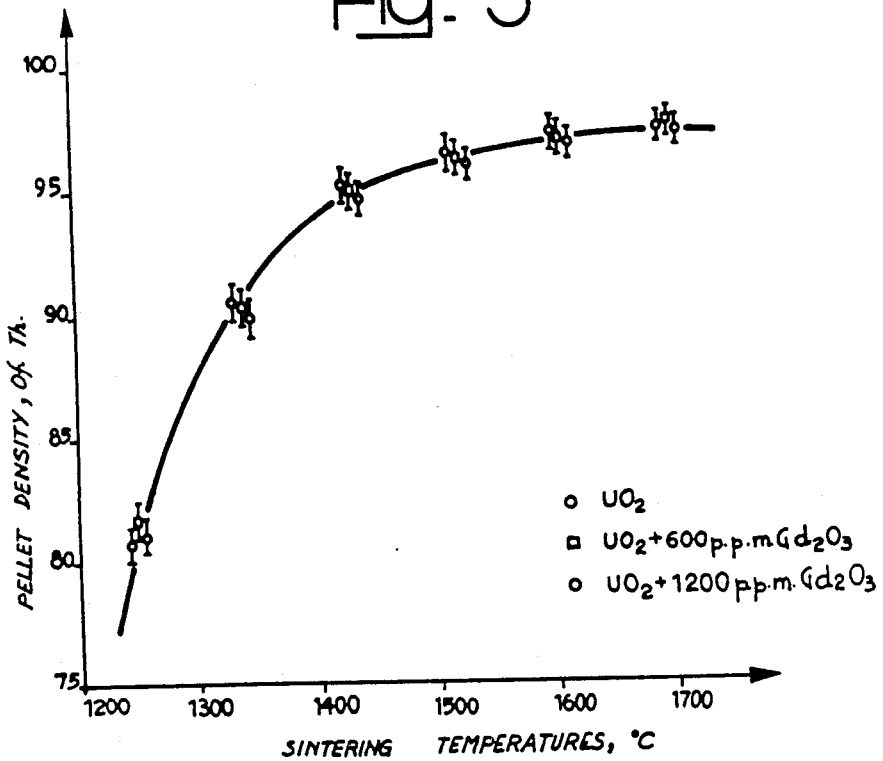
FIG. 5 shows the sintering curves, over a two-hour period, at various temperatures, for the pellets containing poison and the pellets without poison.
Figure 6:
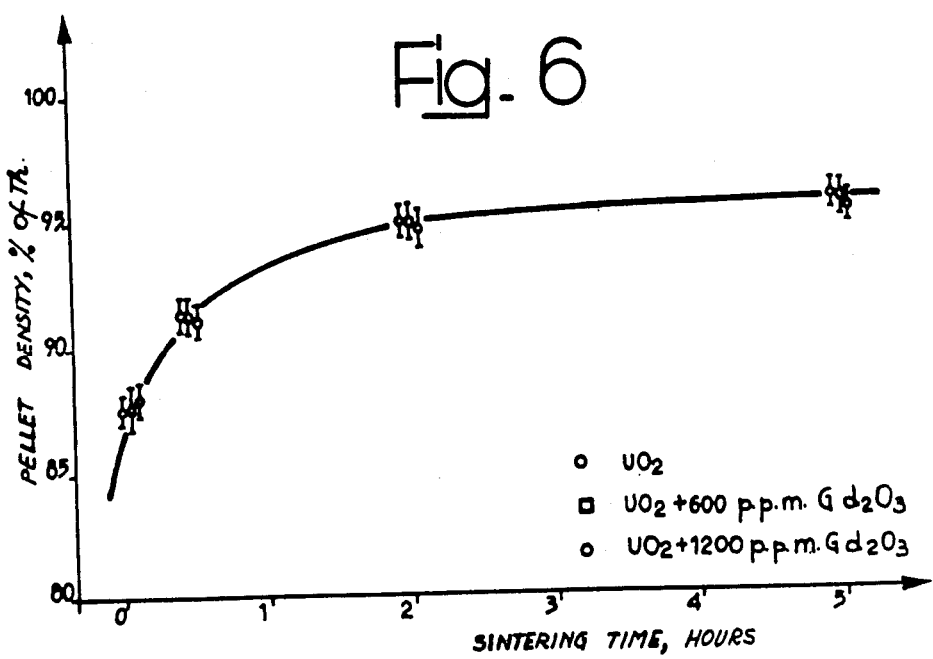
FIG. 6 shows the sintering curves, for various sintering times, at 1,400°C., for the above pellets containing poison and free from posion.
Figure 7:
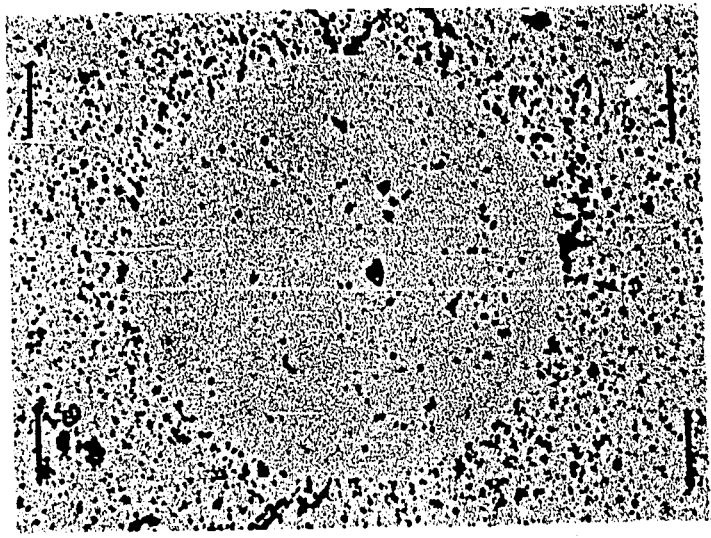

FIG. 7 is a photograph (100 x) of a polished section of a micro-sphere of $Gd_2O_3$ coated with molybdenum, after being incorporated into uranium dioxide and sintered in hydrogen for 2 hours at 1,700°C. From this it can be seen that there is no trace of reaction between the coated microsphere and the uranium dioxide, nor is there any other adverse effect whatsoever.

The pellets were subjected, after sintering, to all the tests normally made prior to irradiation, that is to say determination of open and closed porosity, corrosion-resistance, in pressurised water, and so forth.

No substantial difference whatever was found between the pellets free from $Gd_2O_3$ and those containing it.

It is therefore considered that the process described provides a nuclear fuel, containing uniformly distributed consumable poison, which presents attractive practical features.

EXAMPLE II

Metal borides, prepared in micro-sphere form by a sol-gel process and coated with ceramic oxides, were incorporated by way of consumable poisons into uranium dioxide. Among these borides, particular mention may be made of uranium borides and the borides of metals having a low neutron-capture section, such as, for example, zirconium.

What we claim is:

1. A method of preparing a sintered nuclear fuel comprising a sintered mixture of uranium dioxide particles and consumable nuclear poison particles uniformly distributed therein, and wherein said poison is a rare earth oxide, said method comprising the steps of:
   a. preparing microcapsules of the said poison of 10–2000 microns in diameter by gelling droplets of a sol of a hydroxide of the rare earth in a dehydrating liquid essentially consisting of a long-chain alcohol to form microcapsules, washing the gelled microspheres, heating the microspheres sufficiently to increase their density to at least 96% of the theoretical density, and then further heating the microcapsules to substantially the maximum temperature to be used in the sintering in step (e) hereof;
   b. coating the microspheres obtained in step (a) with molybdenum metal by fluidizing said microspheres in an atmosphere consisting of an inert gas and molybdenum hexacarbonyl vapor at an elevated temperature thereby to deposit molybdenum metal on the surface of the microspheres;
   c. mixing the coated microspheres obtained in step (b) with ceramic grade uranium dioxide powder;
   d. pressing the mixture of coated microcapsules and uranium dioxide powder into pellets; and
   e. sintering the pellets under a hydrogen blanket.

2. The method of claim 1, wherein the rare earth oxide is gadolinum oxide.

3. The method of claim 1, wherein the long-chain alcohol is selected from the group consisting of aryl alcohol, 2-ethyl-1-hexanol, and a blend of predominantly long-chain $C_7$–$C_9$ alcohols.

4. The method of claim 1, wherein the inert gas is argon.

5. The method of claim 1, wherein sintering of the pellets in step (e) is carried out at a temperature of from 1400°C to 1700°C for a period of about 2 hours.

* * * * *